(12) United States Patent
Tan et al.

(10) Patent No.: US 9,106,811 B2
(45) Date of Patent: Aug. 11, 2015

(54) GENERALIZED NORMALIZATION FOR IMAGE DISPLAY

(75) Inventors: Weining Tan, Mississauga (CA); Steven Charles Read, Mississauga (CA); Matthew O'Dor, Toronto (CA)

(73) Assignee: IMAX Corporation, Mississauga, ON ( * ) Notice: Subject to any disclaimer, the term of this patent is extended or adjusted under 35 U.S.C. 154(b) by 0 days.

(21) Appl. No.: 14/233,471

(22) PCT Filed: Jul. 20, 2012

(86) PCT No.: PCT/IB2012/053716
§ 371 (c)(1),
(2), (4) Date: Jan. 17, 2014

(87) PCT Pub. No.: WO2013/011491
PCT Pub. Date: Jan. 24, 2013

(65) Prior Publication Data
US 2014/0160301 A1    Jun. 12, 2014

Related U.S. Application Data

(60) Provisional application No. 61/510,273, filed on Jul. 21, 2011.

(51) Int. Cl.
*H04N 17/00* (2006.01)
*H04N 17/02* (2006.01)
*H04N 5/21* (2006.01)
(Continued)

(52) U.S. Cl.
CPC .. *H04N 5/21* (2013.01); *G06T 5/00* (2013.01); *G06T 7/0018* (2013.01); *H04N 5/211* (2013.01); *H04N 5/74* (2013.01); *H04N 9/3182* (2013.01); *H04N 9/3185* (2013.01);
(Continued)

(58) Field of Classification Search
CPC .................. H04N 9/3197; H04N 13/0239
USPC ........................... 348/191, 42, 744
See application file for complete search history.

(56) References Cited

U.S. PATENT DOCUMENTS

| 5,758,036 A | 5/1998 | Scarpetti |
| 6,157,424 A | 12/2000 | Eichenlaub |

(Continued)

FOREIGN PATENT DOCUMENTS

| EP | 0506302 | 9/1992 |
| EP | 1460611 | 9/2004 |

(Continued)

OTHER PUBLICATIONS

Smit et al., "Non-Uniform Crosstalk Reduction for Dynamic Scenes", Virtual Reality Conference, Mar. 2007, pp. 139-146.

(Continued)

*Primary Examiner* — Jefferey Harold
*Assistant Examiner* — Omer Khalid
(74) *Attorney, Agent, or Firm* — Kipatrick Townsend & Stockton LLP

(57) ABSTRACT

Certain aspects relate to a method and system whereby any defined system characteristic, property, or parameter can be normalized for farther improving the displayed image quality. The normalization processing can use a generalized calibration process and can normalize a system characteristic, or a system property, and/or parameter to result in a more uniform or accurately displayed image using a generalized image processing method.

25 Claims, 8 Drawing Sheets

(51) Int. Cl.
H04N 13/00 (2006.01)
H04N 13/04 (2006.01)
H04N 9/31 (2006.01)
G06T 7/00 (2006.01)
G06T 5/00 (2006.01)
H04N 5/74 (2006.01)

(52) U.S. Cl.
CPC ........ *H04N 9/3194* (2013.01); *H04N 13/0007* (2013.01); *H04N 13/0459* (2013.01)

(56) References Cited

U.S. PATENT DOCUMENTS

| | | | |
|---|---|---|---|
| 6,532,008 | B1 | 3/2003 | Guralnick |
| 2005/0180006 | A1 | 8/2005 | Mendoza |
| 2005/0190258 | A1 | 9/2005 | Siegel et al. |
| 2009/0244266 | A1 | 10/2009 | Brigham |
| 2010/0321382 | A1 | 12/2010 | Amaratunga et al. |
| 2011/0025832 | A1* | 2/2011 | Cowan et al. ........... 348/51 |
| 2011/0080401 | A1 | 4/2011 | Tan et al. |

FOREIGN PATENT DOCUMENTS

| | | |
|---|---|---|
| EP | 1460857 | 9/2004 |
| JP | 2011091516 | 5/2011 |
| WO | 2005078663 | 8/2005 |
| WO | 2005101324 | 10/2005 |
| WO | 2009150529 | 12/2009 |
| WO | 2011071488 | 6/2011 |

OTHER PUBLICATIONS

Woods et al., "Characterizing Sources of Ghosting in Time-Sequential Stereoscopic Video Displays", presented at Stereoscopic Displays and Applications XIII, published in Stereoscopic Displays and Virtual Reality Systems IX, Proceedings of SPIE, vol. 4660, San Jose, California, Jan. 2003, pp. 21-23.
International Application No. PCT/IB2012/053716, International Search Report and Written Opinion mailed on Nov. 23, 2012, 10 pages.
Stereoscopic Displays and Virtual Reality Systems IX, Proceedings of SPIE—The International Society for Optical Engineering, vol. 4660, 2002, 520 pages.
Boev et al., Crosstalk Measurement Methodology for Auto-Stereoscopic Screens, 3DTV Conference, 2007, IEEE, PI., May 1, 2007, pp. 1-4.
BOS, Performance limits of stereoscopic viewing systems using active and passive glasses, IEEE Virtual Reality Annual International Symposium, 1993, 2 pages.
Eichenlaub, An autostereoscopic display with high brightness and power efficiency, Proceedings of the SPIE—The International Society for Optical Engineering, Proc. SPIE—Int. Soc. Opt. Eng., 1994, pp. 4-15.
Feiner et al., Cutaways and ghosting: satisfying visibility constraints in dynamic 3D illustrations, Visual Computer, Jun. 1992, pp. 292-302.
Hoshino et al., A study on resolution and aliasing for multi-viewpoint image acquisition, IEEE Transactions on Circuits and Systems for Video Technology, Apr. 2000, pp. 366-375.
Hsu et al., Design of studies to test the effectiveness of stereo imaging truth or dare: is Design of studies to test the effectiveness of stereo imaging truth or dare: is Design of studies to test the effectiveness of stereo imaging truth or dare: is stereo viewing, Proceedings of SPIE—The International Society for Optical Engineering, vol. 2177, 1994, pp. 211-222.
Ideses et al., Three methods that improve the visual quality of colour anaglyphs, Journal of Optics A: Pure and Applied Optics, J. Opt. A, Pure Appl. Opt., Dec. 2005, pp. 755-762.
Konrad et al., Cancellation of Image Crosstalk in Time Sequential Displays of Stereoscopic Video, IEEE, Transactions on Image, Processing; vol. 9, No. 5, May 2000, pp. 897-908.
Lacotte, Elimination of Keystone and crosstalk effects in stereoscopic video, Rapport technique de l'INRS-Telecommunications, No. 95-31, Dec. 22, 1995, pp. 1-27.
Noble et al., Reducing ghosting on switched-image stereo systems, Programming and Computer Software, vol. 24, No. 5, Sep.-Oct. 1998, pp. 257-263.
Pommeray et al., Image crosstalk reduction in stereoscopic laser-based display systems, Journal of Electronic Imaging, vol. 12, No. 4, Oct. 2003, pp. 689-696.
Siegel, Perceptions of crosstalk and the possibility of a zoneless autostereoscopic display, Proceedings of the SPIE—The International Society for Optical Engineering, vol. 4297, 2001, pp. 34-41.
Stelmach et al., Perceptual basis of stereoscopic video, Proceedings of the SPIE—The International Society for Optical Engineering, vol. 3639, 1999, pp. 260-265.
Tengcharoen et al., Image ghosting elimination in an I-frame of interlaced 3D-video, First International Conference on Mechatronics. Mechatronics—An Integrated Engineering for the New Millennium. Conference Proceedings, vol. 2, 2001, pp. 409-418 (Abstract).
Walworth et al., Efficiency of polarization optics in viewing stereoscopic images, Proceedings of the SPIE—The International Society for Optical Engineering, Proc. SPIE—Int. Soc. Opt. Eng, vol. 4297, 2001, pp. 8-13.
Weigel et al., Ghost image debugging on a 240 degree fisheye lens, Proceedings of the SPIE—The International Society for Optical Engineering, vol. 2774, 1996, pp. 598-609.
Wilcox, Determinants of perceived image quality: ghosting vs. brightness, Proceedings of the SPIE—The International Society for Optical Engineering, Proc. SPIE—Int. Soc. Opt. Eng. (USA), vol. 5006, 2003, pp. 263-268.
Woods et al., Characterizing sources of ghosting in time-sequential stereoscopic video displays, Proceedings of the SPIE—The International Society for Optical Engineering, vol. 4660, 2002, pp. 66-77.
Woods et al., Ghosting in anaglyphic stereoscopic images, Proceedings of the SPIE—The International Society for Optical Engineering, vol. 5291, 2004, pp. 354-365.
European Application No. 12814393.0, Extended European Search Report mailed on Feb. 12, 2015, 12 pages.

* cited by examiner

GENERALIZED NORMALIZATION FOR IMAGE DISPLAY

CROSS REFERENCE TO RELATED APPLICATIONS

This is a U.S. national phase under 35 U.S.C. 371 of International Patent Application No. PCT/IB2012/053716 entitled "Generalized Normalization for Image Display," filed Jul. 20, 2012, which claims benefit of priority under PCT Article 8 of U.S. Provisional Application No. 61/510,273 filed Jul. 21, 2011, each of which is incorporated herein by reference in its entirety.

TECHNICAL FIELD

The present invention relates generally to image projection systems and, more particularly (although not necessarily exclusively), to image projection systems that can normalize a system characteristic, property, and or parameter and use that normalization to enhance displayed images.

BACKGROUND

There are ongoing efforts to improve the quality of motion picture presentations. With the transition to digital projection equipment, new opportunities arise to address visual quality problems in ways that were impossible or otherwise difficult to apply to film projection equipment. For example, attributes of each image pixel can be manipulated to compensate for shortcomings in the projection system.

Displayed image quality can be described in many different ways. For example the image quality in a two-dimensional (2D) presentation can be described in terms of image brightness uniformity, the amount of image ghosting, color balance, or when showing a three-dimensional (3D) presentation there are additional quality aspects to consider such as the balance of brightness, brightness distribution or color between left and right eye image. Image quality variations within one display image can be referred to as intra-projector image quality variations, and image quality problems between two images, such as left and right eye image in 3D presentations, can be referred to as inter-projector image quality variations. In 3D presentations, it may be possible that inter-projector image quality degradation can lead to viewing discomfort by a patron viewing the presentation. Changes in image quality can occur over time and some image quality changes can require more frequent correction. There can be numerous factors that can cause the image quality to degrade. Some factors can occur within the projection or display equipment and some factors may be external to the projector or display that can influence the displayed image. Examples of factors within the projection or display equipment can include light source degradation, light reflections within optics, differences in characteristics between projectors in a dual projection system. Examples of factors outside of the projection equipment that can affect image quality can include light from the display or screen that is reflected back by the audience or other theatre surfaces, or stray light in the theatre from floor lighting or exit lights.

To ensure a consistent image quality that matches the intended image quality to be displayed over time and from theatre to theatre and does not degrade, a solution is desirable that is practical to implement and can be automated to compensate for a variety of quality problems in displayed images when they occur.

Disclosed below is a system and method that is able to address the above mentioned problems.

SUMMARY

Certain aspects and features relate to enhancing image data using normalized system characteristics, properties, and/or parameters.

In one aspect, a method is provided for modifying input image data. An initial system characteristic measured at a target location is received. A system parameter of a system characteristic measured at a remote location is received. An initial normalized system characteristic is computed. A subsequent system parameter measured from the remote location is received. A subsequent system characteristic for the target location is computed using the initial normalized system characteristic and the subsequent system parameter. The subsequent system characteristic is used to modify the input image data to produce normalized input image data for system function processing that outputs enhanced image data for display.

In another aspect, a projection system includes a system characteristic and parameter processor, an input image normalization module and a projector. The system characteristic and parameter processor can determine at least one normalized system parameter or normalized system characteristic. The input image normalization module can modify input image data using at least one of the normalized system parameter or the normalized system characteristic, prior to a projection enhancing, system function to create a virtual projector system. The projector can display enhanced image data from the input image data modified with at least one of the normalized system parameter or the normalized system characteristic.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

DETAILED DESCRIPTION

Certain aspects relate to a method and system whereby any defined system characteristic, property, or parameter can be normalized for further improving the displayed image quality. The normalization processing can use a generalized calibration process and can normalize a system characteristic, or a system property, and/or parameter to result in a more uniform or accurately displayed image using a generalized image processing method. The display device or projector in which the normalization process is applied is referred to herein as a "virtual display device" or a "virtual projector."

In some aspects, displayed images from a digital projector are enhanced by modifying image data prior to being received at a theatre with a digital projector and/or modifying the image data at the theatre with digital enhancing routines within the projection system. One optional, non-exclusive advantage of performing the image data modification at the theatre is that attributes that are specific to the theatre projection system configuration can be included. Certain methods according, to some aspects can further improve presentation image quality and overcome one or more of the problems related to updating display system characteristics and parameters that change over the course of hours, days or weeks. A system according, to some aspects can implement certain methods using a feedback scheme that may more accurately reflect what a viewer sees in which the feedback can be easy to implement, resulting in effective and unobtrusive images displayed to any of the viewers.

In one aspect, an initial system characteristic can be received that has been measured at a target location in a theatre. A system parameter can be received of a measured characteristic of a projection system. An initial normalized system characteristic can be computed. A subsequently measured system parameter of the projection system can be received. A subsequent system characteristic for the target location can be computed using the initial normalized system characteristic and the subsequently measured system parameter. The subsequent system characteristic can be used to modify input image data to generate normalized input image data. Projecting the normalized input image data can result in an improved viewing experience as compared to if the input image data was projected without normalization.

Figure 4:
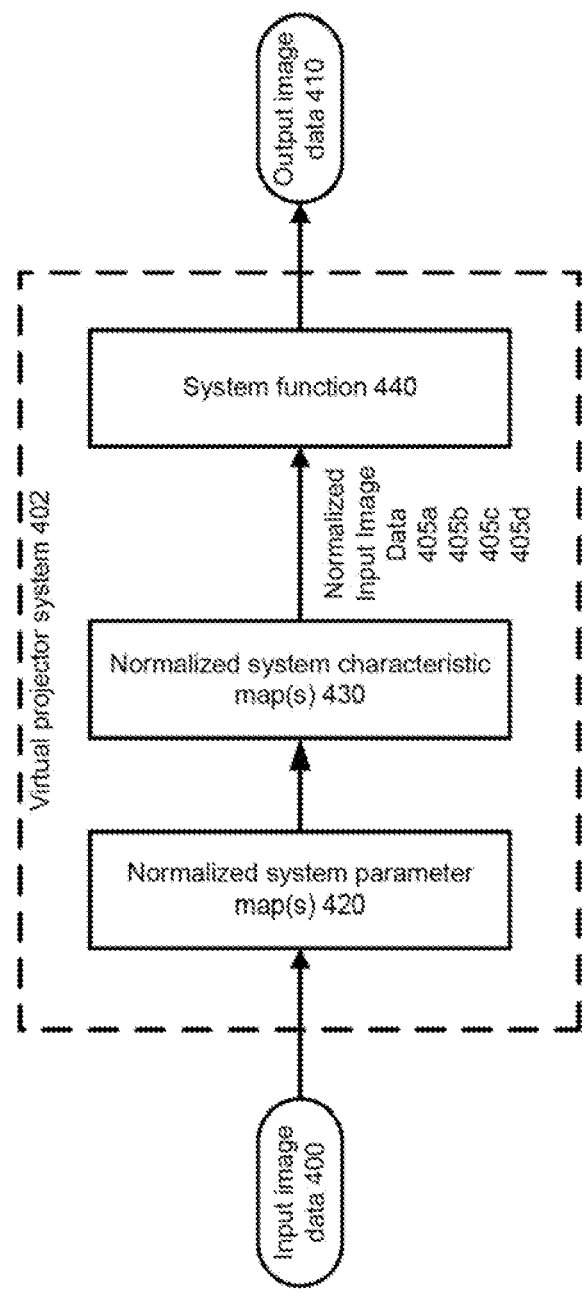
FIG. 4 depicts data flow in a virtual projector system that can normalize input image data for a system function according to one aspect.

Theatres can include digital projectors that are able to process input image data in a way that enhances the displayed image using an image enhancing processor module in this type of system, input image data can be received by the image enhancer, which can modify the input image data and output the modified image data to be displayed. These types of projectors may be incapable of modifying the input image data based on frequent updates of a display system parameter or characteristic that goes through a significant change over a relatively short period of time (i.e. hour, day or week). An automated capability to compensate the projection system to a parameter and or characteristic that changes can be used to ensure an improved presentation quality during the time between maintenance routines and that may address adjusting, the system to correct for changes. FIG. 4 outlines a different system, according to one aspect, in which the image data can be received by a processor device that can use normalized display system parameters and normalized display system characteristics of a projection system so that the projector can function as a more ideal projector in terms of the specific system characteristic or characteristics that have been normalized. This type of projector or display device may be referred to as the virtual projector, or more generally, virtual display device. In the example depicted in FIG. 4, a virtual projector system (402) contains a set of normalized display system parameters (420), a set of normalized display system characteristics (430), and can carry out a set of enhancing functions (440). Input data (400) enters the virtual projector system and is modified based on the normalized display system parameters (420) and the normalized display system characteristics (430), which can be optimized spatially over the screen and can be used to create normalized input image data. The normalized image input data (405a, 405b, 405c, 405d) can be processed by a system enhancing function (440) and outputted (410) by the virtual projector so the modified input image data can be displayed. System enhancing function or system function (440) can be multiple system function processes. De-ghosting feature processing, brightness uniform feature processing, image warping processing, environment aware reflection compensation feature processing, 2D-to-3D conversion processing, and frame rate changing processing are examples of system function processes or enhancing system functions.

Certain systems and methods according to some aspects can generate normalized display system parameters and normalized display system characteristics, which can be provided to modify input image data and can be referred to as normalized system parameter map(s) and normalized system characteristic map(s), respectively. The generation of these maps can be used to modify input image data and can allow the virtual projector to function as a more ideal projector. Using normalized image data within a virtual projector can allow the projector in the theatre to ensure a consistent image quality that matches the intended image quality to be displayed over time and from theatre to theatre, and that does not degrade. Various methods can be used to modify input image data.

In one aspect, the virtual projector can process at least one normalized system characteristic of a stereoscopic display system by modifying at least one related system parameter that has been normalized. A system characteristic may be an attribute or trait that describes one aspect of the projection system function or feature. Examples of such characteristics include on-screen brightness, on-screen image contrast, and ghosting coefficient ratio for stereoscopic display. A system characteristic can have at least one system parameter (or itself), which can determine its result. A system parameter can be a system input, a system configuration setting or the result of another system characteristic. For example, one of such system parameters for ghosting is the inter-projector contrast and a system parameter of projection contrast is the brightness of the individual projector. Normalization of at least one system characteristic can be operated on by manipulating at least one system parameter to achieve the desired profile of the characteristic.

Normalization can be applied to a typical theatre environment that has a screen at one end of the theatre and a projection booth having image projection equipment at the other end. The projector can project an image out of the projection booth through a booth window onto the screen. Between the screen and the projection booth may be a seat or rows of seats at which a viewer or viewers can be seated to experience the visual presentation.

Figure 1:
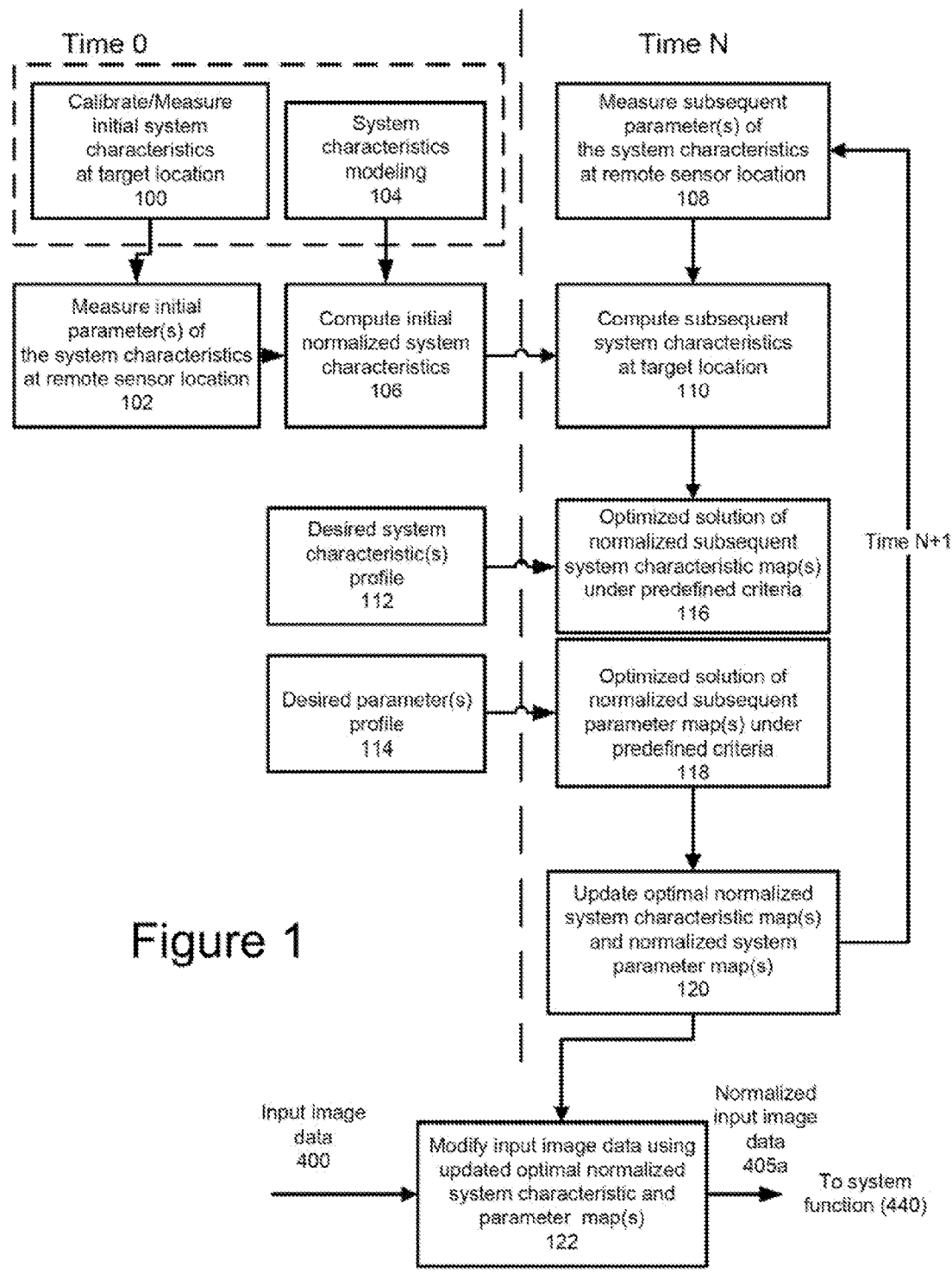
FIG. 1 depicts a method of normalizing input image data with at least one system characteristic inside a virtual projector according to one aspect.

FIG. 1 illustrates the method according to one aspect of generalized normalizing at least one system characteristic to modify input image data for processing in a system function. A system function can be assumed to operate on at least one system characteristic and one system parameter. Various methods can be used and are not limited to that depicted in FIG. 1. For example, multiple system characteristics and multiple system parameters can be used. Also a virtual projector system can have more than one system function. This diagram illustrates only one of those system functions.

The method of FIG. 1 can be divided into three sequences. The first sequence (100, 104, 106, 108, 110) includes capturing system parameter and system characteristic data at the time the system is being, initially calibrated, or a time t=0. The characteristic can include parameters that are relatively stable or "constant" and/or parameters that are changing over a time period (i.e. time being an hour, day, week). The calibration data can be updated periodically, at a later time t=N, to match the current situation of the display system. The second sequence (112, 116, 114, 118, 120) includes optimizing spatially over the area of the screen/display the system characteristics and system parameters using optimization methods with constraints to produce optimal normalized system characteristic maps and optimal normalized system parameter maps. The third sequence (122) includes applying optimal normalized system characteristic maps and optimal normalized system parameter maps to modify the input image data and produce normalized input image data (405a).

In FIG. 1, blocks on the left can be performed at an initial time t=0 and right side blocks can be performed again after a time t=N. Time N can represent a period that is relatively more frequent than the calibration sequence at time t=0 would be repeated. The calibration sequence may not occur once, but if repeated it can occur after a much longer period of time relative to time t=N. The actions performed in time t=0 can capture the system properties that are relatively stable and unlikely to change, while time N may be a relatively frequent event. The actions performed in time N can capture the system properties that are dynamic and change over time. In FIG. 1, blocks (100, 102, 104, 106, 112, 114) are being performed at time t=0, blocks (108, 110, 116, 118, 120) are being performed at time t=N, and blocks (108, 110, 116, 118, 120) are performed iteratively at time t=N+1.

It may not be possible to create for each viewing seat the best image possible because modifying input image data differently to optimize the projection system characteristics and parameters for each seat can be difficult. To compensate, a single viewing location that is the most representative to obtain the best average viewing quality can be determined. This single viewing location can be referred to as the target viewing location, or target location. The target location can be identified for the calibration sequence to obtain data representing the data for each theatre seat location.

For the calibration sequence, it is possible to place the sensor at the target location. For subsequent measurements, the target seat location may not be a practical location for the measurement sensor. From the target location the sensor can make system characteristic measurements to determine the characteristic value or parameter value for every pixel on the screen. For subsequent measurements at t=N the target location may be impractical because the sensor may not always have a clear view of the screen when patrons are present or to get a clear view of the screen the sensor would be in a patron's view of the screen; or it may be inconvenient or costly to install or uninstall such a sensor at target location; or it may be inconvenient or costly to move an installation of such sensor if the determination of target location gets changed. On the other hand, to put the sensor at locations other than the target location, the system characteristic measurements may not be the same as the measurement at the target location. The optimum subsequent data to use in the image enhancing algorithms in the system function (440) may not be obtainable.

The method in FIG. 1 can begin by taking an "initial system characteristic" measurement at the target location, as depicted by block 100. This measurement may be done after the projection system has been properly setup in the theatre, the screen is in its final form and the theatre auditorium is in a finished state. At the same time t=0 at least one initial parameter of the system characteristic is made at the remote sensor location, as depicted by block 102. This system parameter may be related to the system characteristic. The location of the remote sensor may be closer to the projection booth or in the projection booth or integrated into the projector.

In block 106, the system characteristic measured at the target location (100) is normalized with respect to a parameter of the system characteristic measured at the remote sensor location (102).

An example of a system characteristic is a ghosting coefficient, g. The initial system characteristic may be a measurement of g at the target seat location at t=0. An example of one parameter that the system characteristic g is related to is the left and right eye image brightness "$\beta_L$" and "$\beta_R$" on the screen, which may be measured from a sensor at the remote location at t=0. Since the image brightness can vary over the screen area, image brightness maps can be used to represent left and right eye image brightness values for positions on the screen.

Using the calibrated initial desired system characteristic at target location at time t=0 (100), the measured system parameter at the remote sensor location at time t=0 (102) and the normalized system characteristic (106) can be computed. The normalized system characteristic (106) may be a relative measure of actual system characteristic, with removed system parameter dependency or it may be a relative measure of actual system characteristic with unit system parameter dependency. The initial system characteristic calibrated in (100) can be normalized against the measured system parameter (102).

In another aspect, the normalization in block (106) may use system modeling knowledge from block (104). The system characteristics modeling (104) can provide a mathematical system model that describes the relationship among different system parameters and/or different system characteristics, which can be used to derive a normalized system characteristic at the target seat.

When using a mathematical system model (104), one or more system parameters can be derived. The system parameter may be a function of a number of factors such as the brightness from the projector integrating bar, projector lens characteristics, geometric relationship between screen, seat positions and point of projection, spacing between dual projectors, field of projection angle, screen depolarization properties and gain functions, or other static or dynamic system properties. The dynamic system properties can be captured in real time by an in theatre or an in-projector remote sensor. For example, the brightness distribution on the screen from each projector of a given test pattern can be captured by a remote camera. The relative change to the brightness distribution can be derived from the historical and current data captured by the camera. A system characteristic (104) can be derived from the model to obtain the initial normalized system characteristics (106). If the initial system characteristic for the target location is derived by the model of the system (104), a measurement of the initial system characteristic at the target location (100) and the initial parameter measurement (102) may not be required. Using the model of the system can provide a reasonable approximation of the system characteristic for the target location; however, a measurement of the initial system characteristic at the target location and a measurement of the initial parameter at the remote sensor location may provide a more accurate result.

The normalized system characteristic (106) can be normalized with respect to a specific parameter. When the specific parameter is subsequently updated by another measurement from the remote sensor location (108) at a later time t=N, the subsequent system characteristic for the target location (110) can be determined. The remote sensor location can be the same for the subsequent measurement as the initial measurement to determine the correct subsequent system characteristic for the target location.

The actions in blocks (100, 102, 104, 106) may be performed once, while actions in blocks (108 and 110) may be performed in as many iterations as necessary at subsequent times to retain the system characteristic for the target location current.

The result of computation in (110) may be used directly by a system function (440) without any further processing.

The method in FIG. 1 may further normalize the system characteristics by comparing the subsequent system characteristics of a target location (110) to a predefined desired system characteristic distribution profile (112) to produce normalized subsequent system characteristic map(s) that are optimized (116) and normalized with respect to the desired characteristic profile (112). The optimal maps can be updated (120) with each update of the subsequent system characteristics. When input image data is modified by the optimal maps (122), the displayed image data can appear optimal at the target location in terms of the characteristics that were normalized.

Distribution or profile normalization can begin with the normalization of subsequent system characteristic (110) with desired system characteristic profile (112) under predefined criteria in block (116). The desired system characteristic profile (112) may include a distribution of system characteristic different from the updated system characteristic measured (or calculated) from the existing system (110). To normalize existing measured for calculated) system characteristic (110) to match the desired system characteristic profile (112), the system characteristic (110) can be reshaped by modifying part of at least one of its system parameters. The modified system parameter of each pixel can change the value of system characteristic of each pixel to match as close as possible the value in the desired system characteristic profile (112). The modification may not be able to be carried out due to other system constraints, such as non-negative system parameter value limitation, small gradient in non-intrusive spatial pixel value change, etc. The final result of normalization in (116) may be the solution of a set of optimization equations when combined with other system constraints.

The system characteristic and parameter desired profiles can be based on intra projector (i.e. within one projector) or inter-projector (i.e. between two projectors) variations/profiles or a combination thereof, when used in the normalizing process. If the intra-projector profile is used, the normalization may be intra-projector normalization. If the inter-projector profile is used, the normalization may be inter-projector normalization. For inter-projector normalization the desired system characteristic or system parameter profile of one projector can be targeted to match a predefined profile related to another projector. Generally, in a two projector system, the predefined profile may be the same profile for each projector or it may be different. The distribution of the difference between the left and right projectors of a given system characteristic or system parameter can be targeted to match a predefined profile. The differences can be calculated from one projector to another projector as a reference. For intra-projector normalization, the desired profile may be uniform within the projector.

A projection system can include a virtual projection system for which a measured system characteristic or parameter of the projection system can be made to match a desired profile with multiple projection systems such that the desired system characteristic or parameter profile is the same for all of the projection systems. This may be advantageous when a projection system in one theatre can display an image with a system characteristic and parameter that is the same as another projection system display image in another theatre. By having a predefined profile that can be the same from projection system-to-projection system in theatres, the projection systems in each of the theaters can display images with greater quality consistency between theatres.

The above profile normalization process (116) may be an optimization process that identifies the best balance point of the constraints and to match the desired profile as much as possible. The best case is that it can match the exact desired profile of (112). The worst case is that it fails to match to any extent and retains the original values. In the latter case, the subsequent system characteristics are used to modify the image data (122).

Figure 2:
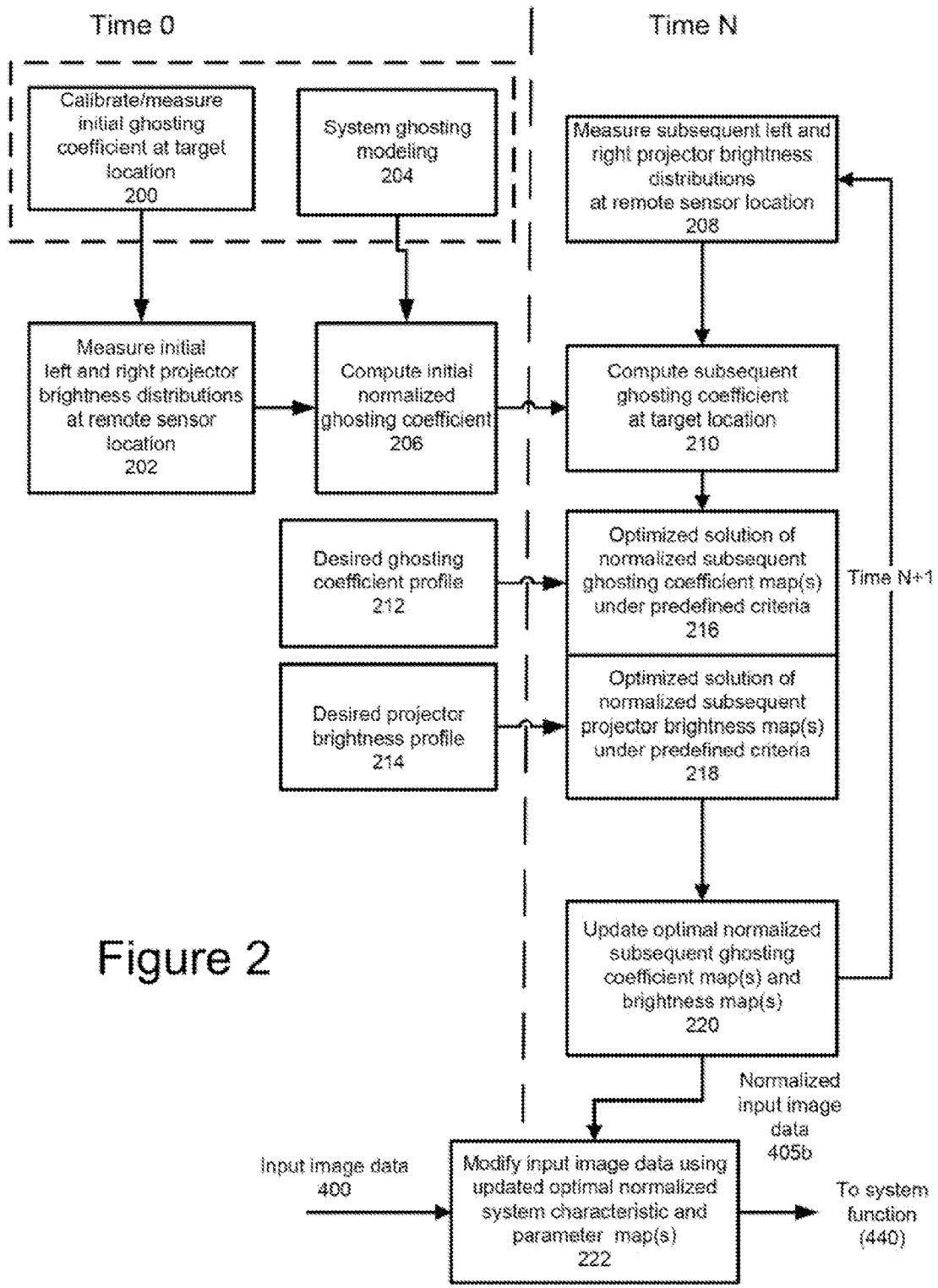
FIG. 2 depicts a method to normalize input image data with using normalized ghosting coefficient and normalized brightness inside a virtual projector for a de-ghosting function according to one aspect.

FIG. 2 illustrates one example of the method in FIG. 1 when applied to a virtual projection system in which the ghosting coefficient is the system characteristic and brightness is the parameter of the system characteristic. Subsequent ghosting coefficient maps normalized to a predefined desired ghosting coefficient profile can be optimized and used to modify input image data to produce normalized modified input image data that can be used with system function (440) algorithms such as de-ghosting enhancement algorithms. The method can assume a de-ghosting function operates on ghosting coefficient ratio and the desired ghosting coefficient profile can be based on inter-projector normalization and the projector brightness can be adjusted by modifying image pixel values.

In this example, (200, 202, 204, 206, 208, 210) can be used to obtain the initial and subsequent ghosting coefficient values. The ghosting coefficient value may be the ratios of signal strength of the unintended signal (leaked crosstalk) and the intended signal. This ratio may be affected by two system parameters: one may be system ghosting crosstalk ratio determined by polarizer filters and screen depolarization; the other may be the left and right projector brightness (signal strength). The method can assume ghosting coefficients are not constant over tune. The first parameter of ghosting coefficient from polarizer filters and screen depolarization can be relatively stable or regarded as "constant" and the second parameter, projector brightness, can change over a relatively short period of time. The initial ghosting coefficient calibration data can be updated over time to be current.

The initial ghosting coefficient may be the initial system characteristic at the target position (200) measured at t=0. The measurement can occur after the projection system has been initially setup and may be optimized for the theatre. The measurement can be performed again at a much later time during a maintenance service routine. The initial ghosting coefficient can be measured using a sensor at the target seat in a manual or automated way as described in PCT Patent Application No. PCT/IB2009/005945, titled "Methods and Systems for Reducing or Eliminating Perceived Ghosting in Displayed Stereoscopic Images" and filed Jun. 15, 2009. In this PCT patent application, the ghosting transfer function can be equivalent to the term ghosting coefficient but expressed in software code. The ghosting transfer function can relate to how the equivalent to perceived ghosting can be represented by the intended image brightness in code value with respect to the unintended image brightness in code value. At the time t=0 over the whole screen area, the initial ghosting coefficient (200) for the left and right projectors, $g_{target,L}$ and $g_{target,R}$ respectively can be measured from the target location: likewise for the left and right projector brightness (202) $B_{booth,L}$ and $B_{booth,R}$ which can be measured by a digital camera (i.e. remote sensor) at the projector booth location. The normalized ghosting coefficient (206) can be determined using the brightness data (202) measured at the remote sensor location with the initial measured ghosting coefficient data (200) or by using the ghosting coefficient data derived from a ghosting model G(x) (204).

This normalized ghosting coefficient (206) may be a relative measure of actual ghosting coefficient regardless of the brightness difference between the left and right projectors.

$$\begin{cases} g_{norm\_target,L} = G(g_{target,L} * B_{booth,L} / B_{booth,R}) \\ g_{norm\_target,R} = G(g_{target,R} * B_{booth,R} / B_{booth,L}) \end{cases} \quad (1)$$

There are a number of ways the information from the model (204) can be used in computing the normalized ghosting coefficient (206). The model can take into account a number of factors that can influence ghosting such as projected brightness perceivable by viewers and the crosstalk of encoding, and decoding filters. In one example, the model can be used to determine the normalized ghosting coefficient. In another example, the model is used to determine the distribution profile over the screen area of the ghosting coefficient and/or the brightness.

By building a mathematical system ghosting model based on ghosting and brightness, the model considers major inputs that can be related to the determination of ghosting or brightness, and then can derive the ghosting coefficients distribution and/or brightness distribution from the model calculation. If the model is correct, the desired characteristics from target locations can be calculated and updated from one or more dynamic parameters measured in a convenient remote sensor location instead of ghosting or brightness being measured directly at the inconvenient target locations.

From the above calculation of crosstalk and brightness based on the mathematical model, the normalized ghosting ratio distribution can be estimated by finding the ratio of the crosstalk and brightness for each pixel. This ghosting ratio can be defined in linear space. Code space ghosting ratio can be derived by raising, it to the power of system gamma correction.

Several factors can influence brightness and can be modeled in a number of ways. For example, assuming the integrating device inside the projector produces uniform brightness at the SLM, such effects as pin cushion or barrel distortion can be modeled for the projection lens. The severity of this type of distortion can depend on the lens aperture in which viewers recognize this distortion as vignetting effects.

Another factor that can affect brightness can be related to screens that tend to have a cylindrical shape to provide more image light to viewers. This screen influence can also be modeled in terms of its effects on brightness to the viewer.

Another factor that can affect image brightness is when light is reflected on the screen. The image brightness can be determined by the screen gain function. The silver screen or screen paint can be a BRDF (bidirectional reflectance distribution function) device and the gain can be a four-dimensional function of light incident angle, the reflective angle, azimuth angle and zenith angle. The incident angles and reflective angles can be related to theater geometry, projector position and viewer's location. The incident angle $\theta_i$ is the angle formed by incident light ray and the surface normal orientation, while the reflective angle is the angle formed by reflective light ray and the surface normal orientation. The modern model defined by Fred Nicodemus can be used to describe the performance of a screen in the following way:

$$f_r(\omega_i, \omega_0) = \frac{dL_r(\omega_0)}{dE_i(\omega_i)} = \frac{dL_r(\omega_0)}{L_i(\omega_i)\cos\theta_i d\omega_i} \quad (2)$$

L is the radiance, E is the irradiance, $\omega_i$ refers to the incoming light, and $\omega_o$ refers to the outgoing light. For a specific silver screen, the actual gain function with parameters of incident and reflective angle can also be provided by the manufacturer or acquired by in-house measurements. The reflected image brightness from the screen and projector output for each viewing location can be estimated by using this mathematical model. The reflected image brightness can appear as a distribution, such as a group of concentric ellipses, with the central region having the highest brightness and the brightness diminishing from the center to the outer boundaries. When the viewing location is changed to the left side or right side of seating deck, the center of the concentric distribution can slightly shift to the left or right accordingly.

Another factor that can be considered in the modeling of brightness can occur when using dual projector system, whereby the spacing between left and right projectors contributes to a light distribution shifting when left and right images are overlapping on the screen.

To calculate the ghosting ratio or signal to noise ratio (SNR) in the model, the crosstalk of the system can be modeled. When light goes through polarized encoding and decoding filter pairs, the transmission-to-extinction ratio can follow a distribution that is maximized along two polarization axis and can diminish further out from the polarization axis. The crosstalk distribution can be stable and in a polarization system in which one polarization axis is along 0 degrees (e.g. horizontal for a left eye image) and the other polarization axis is along 90 degrees (e.g. vertical for a right eye image). Crosstalk can be minimized along the horizontal axis and the vertical axis. Along each diagonal axis, however, crosstalk may more significant.

One factor in crosstalk may be from the depolarization effects of the silver screen on polarized light. The screen depolarization ratio may be considered almost constant regardless of the viewer's seating location and image color. The depolarization effect on crosstalk may have a similar distribution as the gain function in addition to the effect caused by the polarizer filters. The factors affecting crosstalk can be calculated from specifications provided by the polarizer and screen manufacturer.

In the example where the ghosting characteristic is the ghosting coefficient represented by g, the ghosting coefficient when a portion of the left eye image leaks over to the right eye can be represented by $g_{(L \rightarrow R),target}$ for a target seat. The ghosting coefficient when a portion of the right eye image leaks over to the left eye can be represented by $g_{(R \rightarrow L),target}$ for the target seat. The ghosting coefficient at the target seat at a subsequent time can be $g'_{(L \rightarrow R),target}$ and $g'_{(R \rightarrow L),target}$ and can be related to the initial ghosting coefficient $g_{(L \rightarrow R),target}$ and $g_{(R\to L),target}$. The brightness measurements at the remote sensing location (e.g. the booth) can be based on the following relationship:

$$\begin{cases} g'_{(R\to L),target} = \dfrac{B_{booth,L} g_{(R\to L),target} B'_{booth,R}}{B_{booth,R} B'_{booth,L}} \\ g'_{(L\to R),target} = \dfrac{B_{booth,R} g_{(L\to R),target} B'_{booth,L}}{B_{booth,L} B'_{booth,R}} \end{cases} \quad (3)$$

$B_{booth,L}$ and $B_{booth,R}$ is the brightness of the left and right eye image light respectively at the remote sensor location measured at the time the initial ghosting coefficient is being determined at the target seat. $B'_{booth,L}$ and $B'_{booth,R}$ can be measured at a subsequent time at the remote sensor location. In the method of FIG. 2, at time 0, the ghosting coefficient ($g_{(L\to R),target}$ and $g_{(R\to L),target}$) can be determined at the target seat location in block (200). At the same time, the initial left and right eye image brightness $B_{booth,L}$ and $B_{booth,R}$ can be measured at the remote sensor location in block (202). Based on $g_{(L\to R),target}$, $g_{(R\to L),target}$, $B_{booth,L}$ and $B_{booth,R}$, the normalized ghosting coefficient for the target seat can be computed as follows in block (206):

$$\begin{cases} g'_{(R\to L),norm,target} = \dfrac{B_{booth,L} g_{(R\to L),target}}{B_{booth,R}} \\ g'_{(L\to R),norm,target} = \dfrac{B_{booth,R} g_{(L\to R),target}}{B_{booth,L}} \end{cases} \quad (4)$$

At a later time N, such as before or after a show, or each day or week, a subsequent measurement of the left and right projector brightness can be made at the remote camera location (208). Subsequent ghosting coefficient values for the target location (210) can be computed based on the subsequent left and right image brightness values and the normalized ghosting coefficients. An updated version of ghosting coefficients can be determined based on brightness measurements that can be obtained from the remote sensor positioned at the projector booth location. A repeat of the calibration process involving a sensor at the target seat may not be required to keep the ghosting coefficient figures current. The processes (200, 202, 204, 206) can be carried out once, while processes (208 and 210) can be carried out in as many iterations as necessary at time N+1 to keep the ghosting coefficient calibration up to date.

In the example where the normalized ghosting characteristic is computed, $g_{(L\to R),norm,target}$ and $g_{(R\to L),norm,target}$ (in block 206) can be used with subsequent brightness measurements $B'_{booth,L}$ and $B'_{booth,R}$ (208) to determine the subsequent ghosting coefficient $g'_{(L\to R),target}$ and $g'_{(R\to L),target}$ for the target seat (in block 210) using the following relationship:

$$\begin{cases} g'_{(R\to L),target} = \dfrac{g_{(R\to L),norm,target} B'_{booth,R}}{B'_{booth,L}} \\ g'_{(L\to R),target} = \dfrac{g_{(L\to R),norm,target} B'_{booth,L}}{B'_{booth,R}} \end{cases} \quad (5)$$

Further normalization can occur at block 216 in which subsequent ghosting coefficient figures can be normalized with respect to a desired ghosting coefficient profile (212) determined under a predefined criterion to produce normalized ghosting coefficient map(s). There ma be situations in which a distribution of ghosting coefficient matches a ghosting coefficient profile (212) that is different from the ghosting coefficient distribution measured (or calculated) from the existing system (210). The method used in this reshaping of ghosting coefficient distribution can optimize the normalization process of ghosting coefficient. The optimal normalization processes in (216) can be performed using various processes. One process may be intra-projector normalization. Ghosting coefficients can be normalized within a projector. The spatial distribution of ghosting coefficients an be targeted to match a predefined profile, but the differences can be compared to a reference associated with a given projector. This intra-projector normalization can be useful to design a virtual common projector with a desired ghosting coefficient distribution within each projector. This desired and predefined ghosting coefficient distribution or profile may be optimized for minimizing the perceived overall ghosting or matching to certain theater geometric design or for simulation or another purpose. Once a virtual projector ghosting coefficient profile is defined, actual projectors can be normalized to match their inherent ghosting coefficient distribution to this virtual projector ghosting coefficient profile. With this optimal normalization, projectors can have a common ghosting behavior regardless of their hardware and geometry differences. This level of uniformity can result in better image quality and projector performance, as well as being implemented using easily deployable and upgradeable software.

Another process can include inter-projector normalization where the ghosting coefficient distribution can be optimally normalized between the left and right projectors. The distribution of the difference between the left and right projectors of ghosting coefficient distribution can be targeted to match a predefined profile. The differences can be calculated from one projector to another projector as a reference. In abstraction of a virtual projector, reshaped one projector ghosting coefficient profile may have a predefined relationship with the other projector reshaped ghosting coefficient profile. In one example, fbr a balanced virtual projector, the left reshaped ghosting coefficient profile can be the same as the right reshaped ghosting coefficient for the best image quality.

In either way of ghosting coefficient distribution normalization, the predefined matching targets can be expressed as subsequent ghosting coefficient maps for left and right projectors respectively.

To normalize existing measured (or calculated) subsequent ghosting coefficient (210) to match the desired ghosting coefficient profile (212), the ghosting coefficient (210) can be reshaped by modifying left and right projector brightness. The left and right image value may be changed to affect the left and right projector brightness. The modified projector brightness of each pixel can change the value of ghosting coefficient of each pixel to match as close as possible to the value in the desired ghosting coefficient profile (212). The modification may not be able to be carried out due to other system constraints, such as non-negative system parameter value limitation, small gradient in non-intrusive spatial pixel value change, etc. The final result of normalization in (216) can be the solution of a set of optimization equations with combined system constraints.

In a similar process, the left and right projector brightness can be normalized with an intra-projector or an inter-projector distribution profile. The normalization can be optimized by solving for another set of optimization equations and constraints for a desired profile (214). By modifying the input image data with the optimal normalized brightness maps (218, 220, 222), the projected brightness of the image can match an image as if it were projected from a projector that has the desired brightness profile. The resultant projector brightness for the projector can be configured to match the target relationship after normalization process. One optional, non-exclusive advantage of normalized projector brightness is that the general image quality can be improved for 2D (intra-projector normalization) and 3D (inter-projector normalization). It may be possible that the image brightness profile can be a uniform constant value or a desired distribution across the screen that is different than the current projector brightness distribution. In either way of projector brightness normalization, the predefined matching targets can be expressed as brightness maps that modify input image data for the projector or modify left and right image input data for left and right projectors respectively.

The above normalization processes in (216 and 218) may be an optimization process that attempts to find the best balance point of the constraints and to match the desired profile as much as possible. In the best case, the process can match the exact profiles of (212) or (214). In the worst case, the process may fail to match to any extent and retains the original values. In the latter case, the subsequent ghosting coefficients can be used to modify the input image data to produce modified input image data that is subsequently used by the dc-ghosting function.

In the current example, ghosting coefficient distribution and brightness distribution can be optimized in the following way. The ghosting coefficient system characteristic can be represented by $g_{R \to L}$, $g_{L \to R}$, which are the ghosting coefficient ratios in linear space for left and right projector respectively (210). $g'_L$, $g'_L$ are updated ghosting coefficient ratios in linear space for left and right projector respectively, which can be calculated in block (210). $g_{R \to L, profile}$, $g_{L \to R, profile}$ are predefined and desired ghosting coefficient ratio profiles (212). $g'_{R \to L, optimal}$, $g'_{L \to R, optimal}$ are adjusted (optimized) normalized ghosting coefficient ratio maps in linear space for left and right projector respectively (216). Brightness transfer functions $N_L(I)$ and $N_R(I)$ can be determined that convert the original image code value $I(I \in [0,1])$ to new projector brightness. The projector brightness value mentioned hereafter refers to values reading from camera sensor in the booth location. The ghosting coefficient adjustment transfer functions $G_L(B)$ and $G_R(B)$ can map input projector brightness to a necessary projector brightness adjustments on both projectors for achieving the normalized ghosting coefficient. Therefore similar to the equation above, the following relationship describes normalized component of ghosting coefficient at time N:

$$\begin{cases} g'_{(R \to L),optimal} = \dfrac{N_L(1) + G_L(N_L(1))}{N_R(1) + G_R(N_R(1))} g'_{R \to L} \\ g'_{(L \to R),optimal} = \dfrac{N_R(1) + G_R(N_R(1))}{N_L(1) + G_L(N_L(1))} g'_{L \to R} \end{cases} \quad (6)$$

Similarly, assuming $B_{L,profile}$, $B_{R,profile}$ are predefined and desired projector brightness profiles (2141), the transfer functions from image code value to brightness profiles $B_{L,profile}$, $B_{R,profile}$ can be established by camera measurement of $B'_L$, $B'_R$. $B'_L$, $B'_R$, which are final image brightness of left and right images. With brightness transfer functions $N_L(I)$ and $N_R(I)$, the following relationships can describe a normalized component of projector brightness and the final total image brightness on screen at time N:

$$\begin{cases} B'_{L,optimal} = N_L(I_L) \\ B'_{R,optimal} = N_R(I_R) \end{cases} \text{ and } \quad (6)$$

$$\begin{cases} B'_L = G_L(B'_{L,optimal}) + B'_{L,optimal} = N_L(I_L) + G_L(N_L(I_L)) \\ B'_R = G_R(B'_{R,optimal}) + B'_{R,optimal} = N_R(I_R) + G_R(N_R(I_R)) \end{cases} \quad (7)$$

The generalized optimized solution can include finding the weighted least square of following error expression with argument mapping functions N and G:

$$\underset{N,G}{\operatorname{argmin}}\left(\sum_I ((B' - B)^2 + \alpha(g'_{optimal} - g_{profile})^2 + \beta(B'_{optimal} - B_{profile})^2)\right) \quad (8)$$

$\alpha, \beta$ are weights for each constraint. This may provide a user with flexibility to choose whether the final result focuses more on ghosting coefficient matching to profile, or brightness matching to profile, or putting more limitation on total image change. A smooth constraint of solution is implied in profile maps g and $B_{profile}$. The additional constraint of above expression can be:

$$B(0) \leq N(I) + G(N(I)) \leq B(I) \quad (9)$$

The formula (8) can express the normalization process as an optimization problem in that a minimized error from image dynamic range change, ghosting coefficient mismatching from profile, and projector brightness mismatching from profile can be reached when one pair of transfer functions N and G are found.

Another aspect of the invention can separate the optimization in (216) and (218) into two steps. In that case, the following two optimization operations can be performed in iterations with an assumption of G(B)=0 for the first iteration:

$$\underset{N}{\operatorname{argmin}}\left(\sum_I ((B' - B)^2 + \beta(B'_{optimal} - B_{profile})^2)\right) \quad (10)$$

$$\underset{G}{\operatorname{argmin}}\left(\sum_I ((B' - B)^2 + \alpha(g'_{optimal} - g_{profile})^2)\right) \quad (11)$$

In this case, the optimized N function can be found first under the minimization constraints of projector brightness profile matching and image fidelity. The optimized G function can be found under the minimization constraints of ghosting coefficient profile matching and image fidelity. In the next iteration, the newly found G can be used in formula (10) to find the next optimized N function and this new N can be used in formula (11) to find the next optimized G function. When the optimized mapping functions N and G are found at the end of the iterations, the input image data can be converted to normalized input data (222), using normalized projector ghosting coefficient maps (216) by a set of took-up tables (LUTs), or otherwise, and processing the normalized input image data (405b) by the system function (440) for better image quality. With this method of optimization, it may be possible to achieve an improvement in desired intra-projector and inter-projector brightness uniformity and reduced ghosting.

Many effective methods can be used to solve the stated optimization problem, such as trust-region and Levenberg-Marquardt methods, or Gauss-Newton methods for smaller scales.

By manipulating, left and right input image data/pixels, the left and right image brightness can be reshaped. The overall modification of image pixels can be abstracted and factored into two levels of change. The first level can include reshaping the left and right image brightness. The second level can include reshaping of the system normalized ghosting coefficient distribution. Reshaping of system normalized ghosting coefficient distribution can be used to normalize different projectors with different individual system characteristics and parameters into one desired general system characteristic and parameter. This generalized level of normalization can provide a virtual digital projector (for example, an abstract virtual IMAX digital projector) with a standard characteristic, which can be useful for applying standard next stage image processing processes or system (i.e. system function 440) and can improve the overall image quality and reliability. With virtual digital projector and uniform digital processing module input output data interface, the general normalization architecture fir image Enhancer (IE) can make other processing, for example, digital re-mastering (IMAX DMR®), color balancing, tone mapping. High Dynamic Range (HDR), active sharpness and etc., easier to deploy and more simplified in operation to render a more reliable system which provides a consistent presentation quality.

The pre-defined normalized ghosting coefficient profile can be defined such that a stereoscopic display system can be reshaped to have this normalized ghosting coefficient profile, or converted to this virtual projector. This virtual projector may not suffer from a ghosting problem. For example, the virtual projector may not suffer a ghosting problem when, after the reshaping, each pixel on a screen of the virtual projector produces a ghosting that is less or equal to the ghosting defined with the profile, which is under an acceptable level.

This method of normalizing projector characteristic into a desired virtual projector characteristic can be used to applications such as de-ghosting and brightness uniformity and to any application within a 3D display device. One characteristic can be identified and normalized based on a set of parameters of this characteristic. The normalized characteristics can be independent to other non-included parameters in the system and reshaped into a set of pre-defined values. The system function that uses these optimized normalized characteristics can have reliable, predictable inputs and therefore can deliver reliable and improved output quality.

Figure 3:
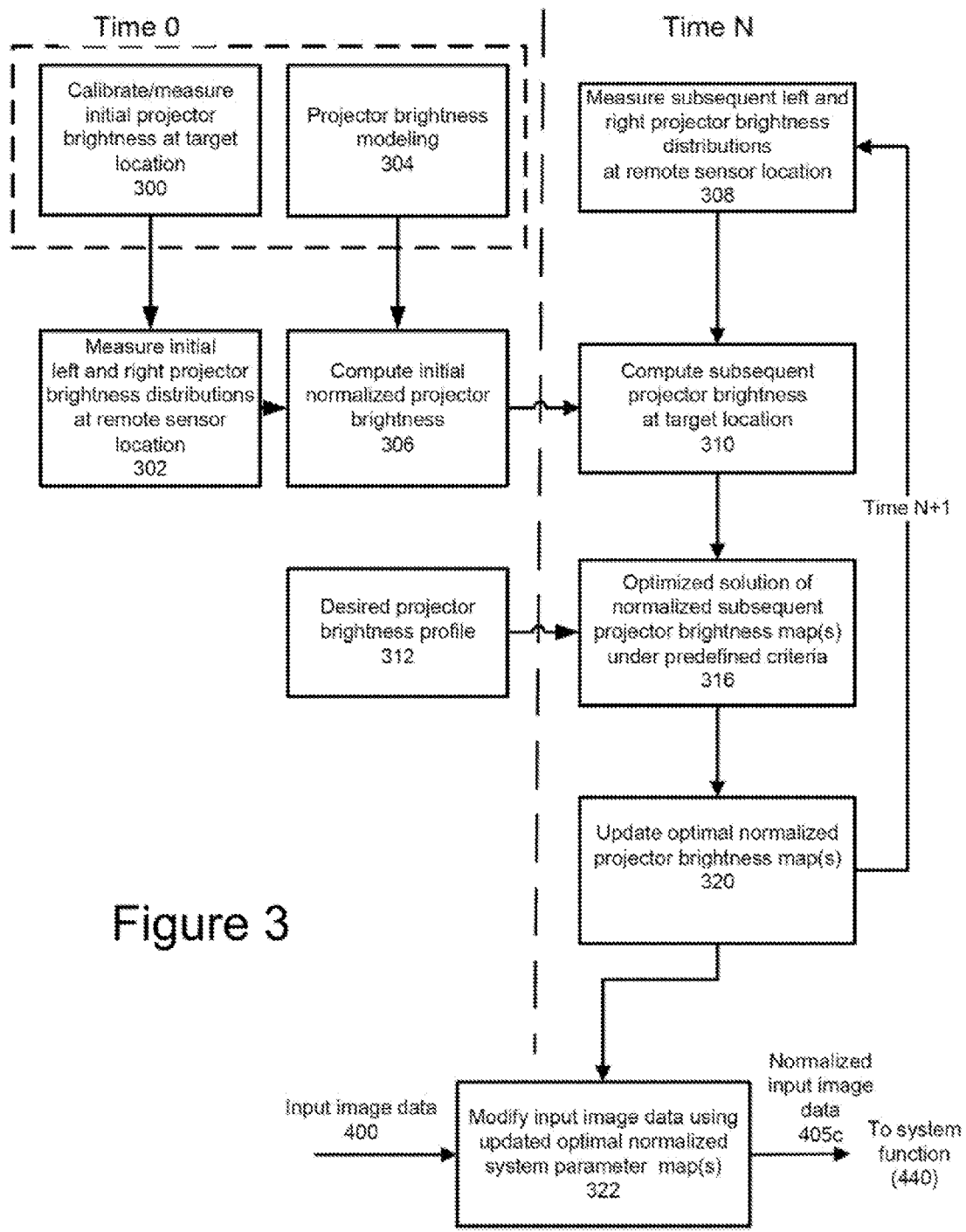
FIG. 3 depicts a method of normalizing input image data with normalized projector brightness inside a virtual projector for a system function according to one aspect.

FIG. 3 illustrates one example of the method in FIG. 1 applied to a virtual projection system in which the brightness is another system characteristic that can be normalized. Subsequent projector brightness maps can be normalized (or optimized) (316) to a predefined desired brightness profile (312), which can be used to modify input image data to produce normalized modified input image data that can be used with system function (440) algorithms such as de-ghosting enhancement algorithms.

Though projector brightness can be one integrated normalization step as a system parameter in de-ghosting system function, it can, in another aspect, be normalized as a system characteristic. Applying the method of FIG. 3 to intra- and inter-projector brightness, the sequence may be as follows.

In block (300) of FIG. 3, initial brightness reading on screen $B_{target}$ can be obtained at the target seat location using a light meter or calibrated camera. At the same time a remote sensor (e.g. a booth camera) can measure $B_{booth}$ with different test pattern maximum values of the left and right projector brightness observed at the remote sensor location. The steps may be similar to the steps described for blocks (202) and (208) in FIG. 2. These steps can be performed during the calibration of the projection system, which can occur at the time t=0 of installing the projection system in a theatre or later. In block (304), the projector brightness system modeling can define the projector brightness and can use a linear model such as $B_L = a_L \cdot I_L^{2.6} + b$ and $B_R = a_R \cdot I_R^{2.6} + b$, where I is the image code value in non-linear space. Projector brightness normalization can be determined at block (306) using the measured brightness at the target location and at the remote location by $$B_{norm} = \frac{a_{target}}{a_{booth}} \approx \frac{B_{target}}{B_{booth}}.$$

At a subsequent time t=N the brightness at the target seat location can change due to a number of factors, such as those identified above. To compute the brightness at the target seat at the subsequent time t=N, a subsequent brightness measurement $B'_{booth}$ can be made at the remote sensor location (308). Using $B'_{booth}$ and $B_{norm}$, the brightness at the target seat location $B'_{target} = B'_{booth} \cdot B_{norm}$ can be computed (310). The computed subsequent brightness at the target seat location can be optimized with a predetermined profile (312) and a solution can be found in block (316) by solving expression (16). Both inter-projector and intra-projector normalization requirements can be expressed in a pair of left and right projector brightness profiles in block 316 to achieve both inter-projector and intra-projector normalization and to produce normalized (optimized) projector brightness map(s). These maps can be updated subsequently (320) and the updated maps can then be used to modify input image data in block 322 to produce normalized input image data (405c). The normalized input image data can be received by the system function module (440) in the virtual projector system (402).

Figure 5:
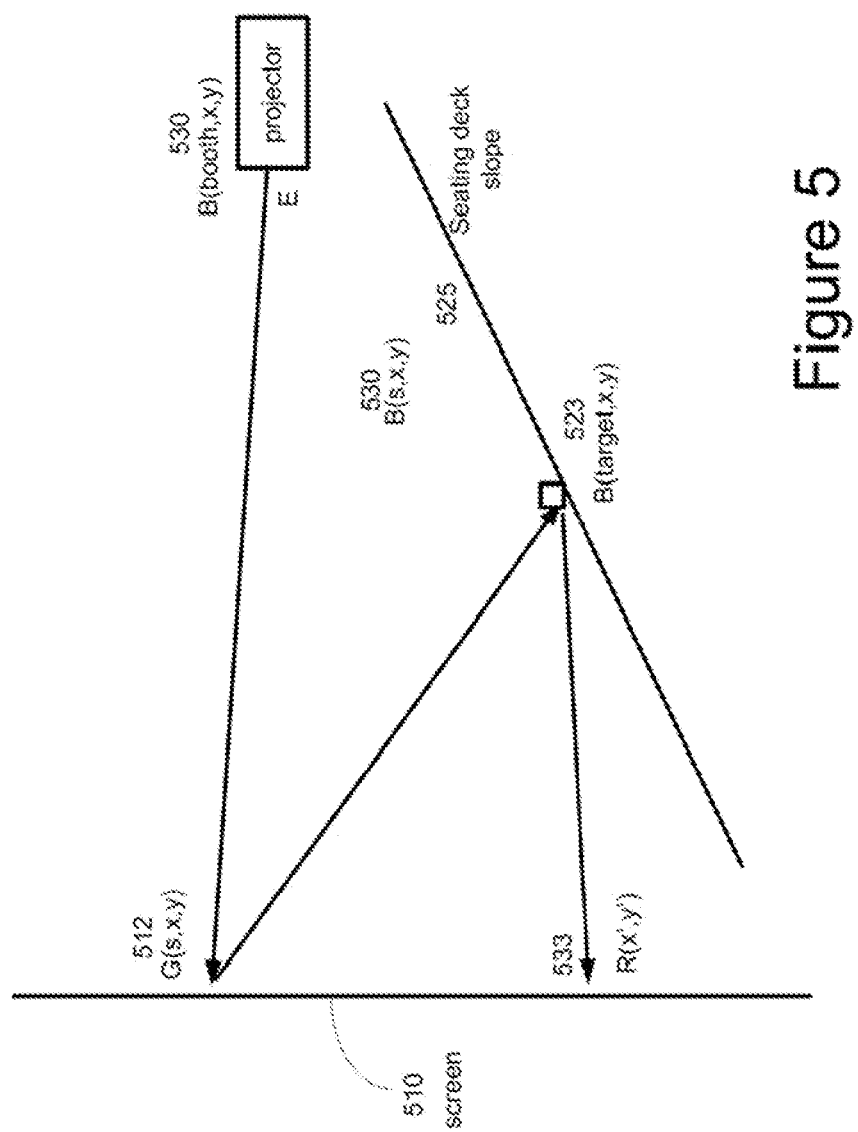
FIG. 5 depicts a model for applying ghosting coefficient and projector brightness calibration updating according to one aspect.

Theatre light reflection and possible stray light in the theatre when combined with the projected image light can cause non-uniformity in projected brightness distribution and image brightness inaccuracy. Theatre light reflection or possible stray light is illustrated in FIG. 5. The projected image light E from projector 530 can reflect off the screen shown by G(s, x, y) 512 to the seating deck shown as B(target: x, y) 523. Light incident on the theatre and viewers can be reflected back to screen represented by R(x',y') 533 and G(s,x,y) 512. The perceived brightness by a viewer at position 523 of both R(x',y) and G(s,x,y) can become the summation of the original projected image light and the light reflected back to the screen at R(x',y) and G(s,x,y). Any theatre light reflection or other stray light that reaches the screen may degrade the image quality by lowering the image contrast or changing the image color. Another source of light reflection that can create error light may occur from within the projection system optics, for example a projection lens. Light that reaches the screen that is not original projected image light may be error light. The error light, if measured, calibrated or calculated correctly, can be pre removed from the original projected image such that, after the compensation, the final image as perceived by the viewer can more accurately represent the intended original image light. The projection system that can implement this feature can be referred to as an environment aware projection system.

Figure 8:
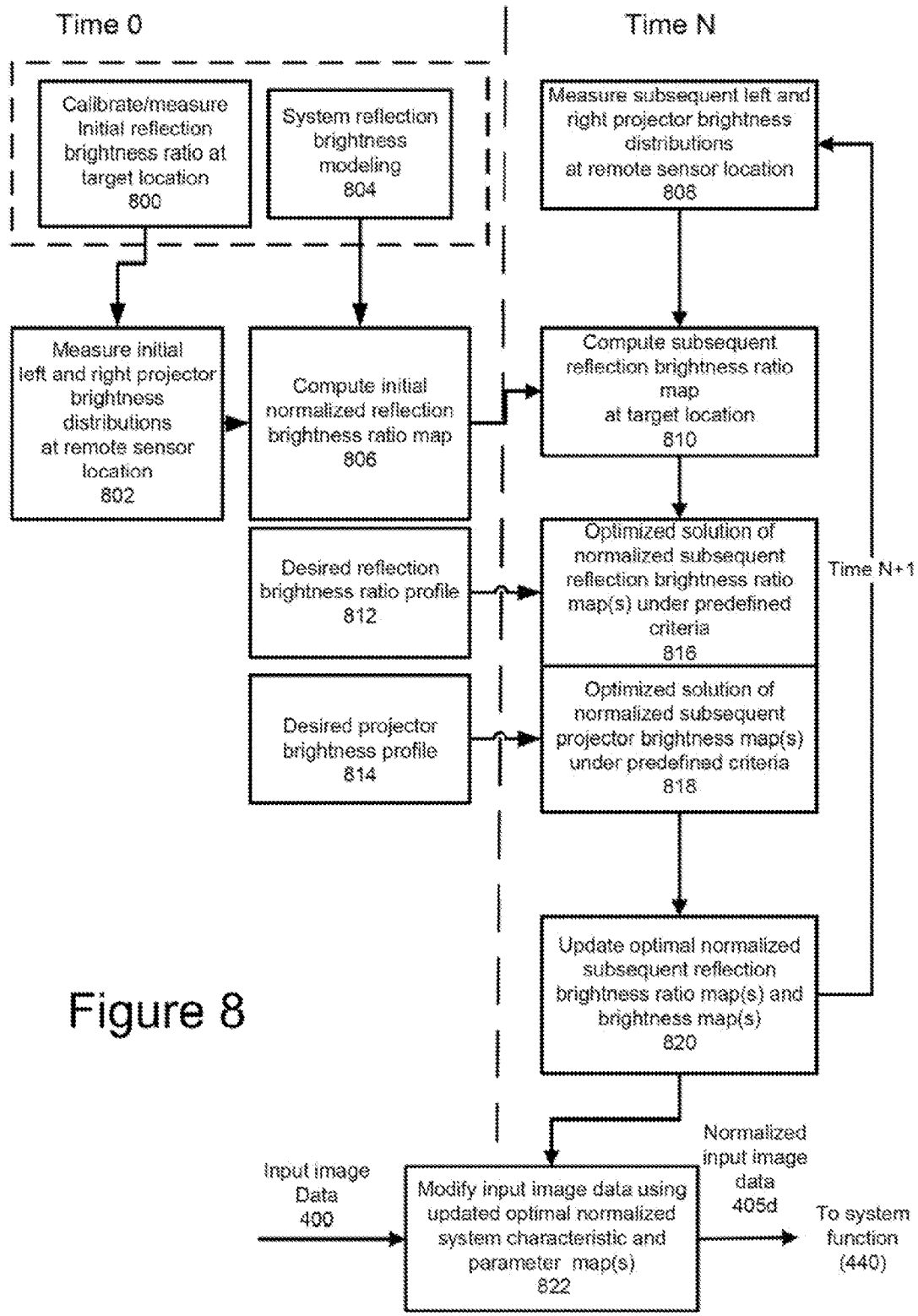
FIG. 8 depicts a method for normalizing input image data using normalized environmental light reflection ratio and normalized brightness inside a virtual projector for an environment aware reflection compensation enhancing function according to one aspect.

FIG. 8 illustrates one example of the method in FIG. 1 to create a virtual projection system in which the reflection brightness ratio or environment reflection brightness ratio is the system characteristic and projector brightness is the parameter of the system characteristic. The reflection brightness ratio can be the portion of light at a screen pixel location that is not the original projected light divided by the portion of light that is the original projected light at the screen pixel location. Subsequent reflection brightness ratio map normalized to a predefined desired reflection brightness ratio profile (812) can be optimized (816). The above normalization processes in (816 and 818) may be an optimization process that attempts to find the best balance point of the constraints and to match the desired profile as much as possible. In the best case, the process can match the exact profiles of (812) or (814). In worst case, the process may fail to match to any extent and retains the original values. In the latter case, the subsequent reflection brightness ratio can be used to modify the input image data to produce modified input image data that is subsequently used by a system function (440). The maps from the normalization processes (816 and 818) can be used to modify input image data (822) to produce normalized input image data (405*d*) that can be used with system function (440) algorithms such as environment aware reflection light compensation enhancement algorithms. In FIG. 4, the virtual projector (402) can use the optimal normalized reflection brightness ratio map (430) with a method of the system function (440) in which the method is an environment aware reflection light compensation enhancement function and whereby the virtual projector system output image data (410) can have image pixel brightness values that are modified.

An environment aware reflection light compensation enhancement function can be a function formulated by seeking a stable solution or the nearest approximation to the stable solution of the equation, such as:

$$u = u' + rC(u') \quad (27)$$

The variable, u, is an original image pixel brightness value, r is the reflection brightness ratio that is calculated from the estimation (804) or calibration (800) of the error light from theatre light reflection, stray light, projector optics light reflection, and C(u) can be a contrast or a sharpness or a color mapping or other enhancement function and is expected to be a function of local and global image content. Depending on the selected function of C(u), the Solution of u' can be found by a closed form or resorting to numerical methods u' normally may be smaller than or equal to the original image pixel brightness value u, but greater or equal to zero. If the estimation or calibration of the reflection brightness ratios and error reflection lights is reasonably accurate, the compensated output image data when displayed can generally have higher contrast, less color artifact and better image quality.

Figure 6:
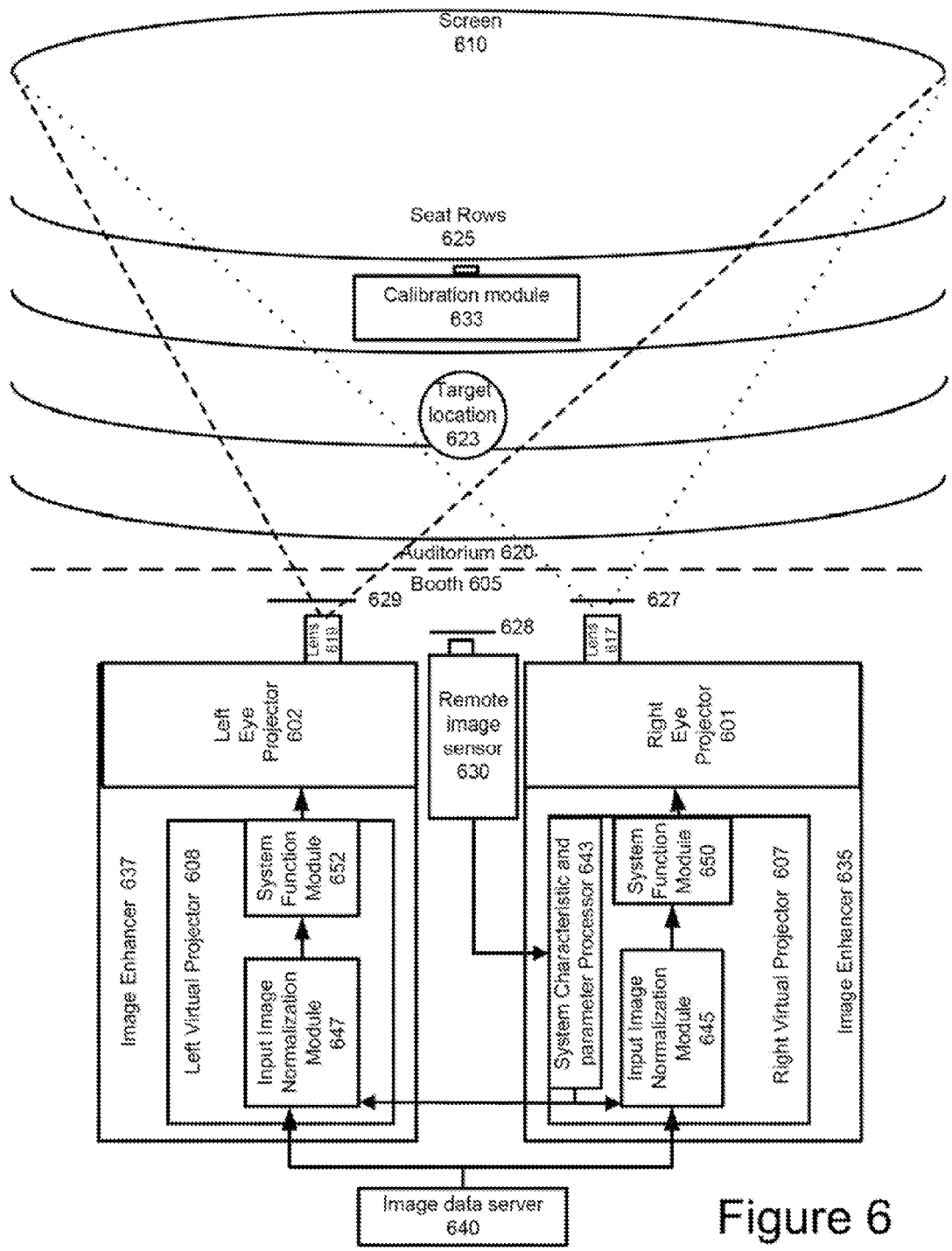
FIG. 6 depicts a projection system configured to normalize input image data to enhance projected images according to one aspect.

FIG. 6 shows one example of a system in which the described methods can be implemented. The system includes a projector (601), or multiple projectors (601 & 602), positioned in a projection booth (605). Projector 601 can project an image via the projection lens (617) onto a screen (610) in the auditorium (620). If there are multiple projectors (601 & 602), each projector can project an image via a respective projection lens (617 & 619) onto the screen (610). If the projection system is 3D, then the left and right eye image projector may have an image encoding device 629 and 627, respectively, in the image light path. There is a seat (623) or rows of seats (625) in the auditorium (620) in which a viewer(s) can view the presentation on the screen (610). One projector (601), or the multiple projectors (601 & 602), can have image enhancing processors (635 or 635 & 637) to receive image data from the image data server (640). The image enhancer or enhancers may modify the image data from the image data server (640) to improve the projected image quality. If the method to normalize input image data is implemented in software within the image enhancer, then the virtual projector (607 and 608) may be disposed in the image enhancer. The image enhancer can carry out a number of other image enhancing functions that are not influenced by the normalized input image data. Such system enhancing functions, are not described but can be a pan of the image enhancer or the virtual projector. A remote (booth) sensor or camera (630) is positioned to provide measurements that can be used by the image enhancers (635 or 635 & 637) to modify the input image data if the projection system is 3D then a decoding device (628) that can switch between left and right decoding states can be placed in front of the camera lens to capture an image data intended for the left or right eye, respectively. The remote sensor or camera can be moved to obtain data from a booth position or an auditorium position. Data can be obtained by the camera, stored within the camera or a PC (not shown) or sent directly to the system characteristic, and parameter processor (643) within the image enhancer (635). The image data from image server (640) is sent to the image enhancer (635 & 637) inside projector system (607) and (608), respectively. The system characteristic and parameter processor module (643) generates the updated optimal normalized system characteristic and parameter map(s), which are provided, to the input image normalization module (645 and 647). The input image data can be modified to produce the normalized input image data by the input image normalizing module (645 and 647). The normalized input image data is passed on to the system function module (650 and 652) in FIG. 6 which can for example do ghosting reduction. After the normalized input image data is enhanced by the system function module, the output image data is provided to the display projector (601 and 602) to be displayed on the theatre screen (610). The processing modules (643, 645, 647, 650 and 652) can be distributed as shown in FIG. 6 or differently, or the processing modules can all be placed in one projector, or the processing modules can be placed externally to the projector, or a combination thereof.

Figure 7:
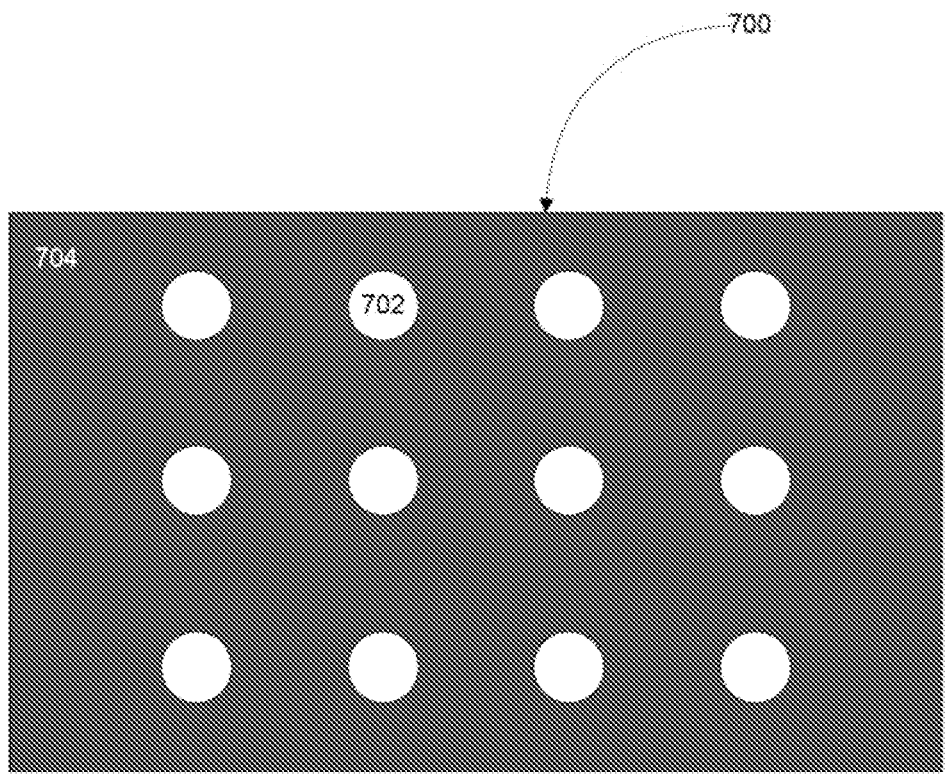
FIG. 7 depicts a test pattern according to one aspect.

In theatres in which the system as shown in FIG. 6 has been setup, a number of measurements can be made to calibrate the projection system. To calibrate the system when making brightness measurements a test pattern as shown in FIG. 7 can be projected. The test pattern (700) can include a number of bright spots (702) on a black background (704) distributed over the screen. A sensor reading from the sensor (623) at the target seat location can be obtained of the center of each of the bright spots in the test pattern. At the same time, a sensor (630) at the booth location can obtain a brightness reading for each of the same brightness spots. The brightness data from the booth sensor and target seat location can be transferred to the system characteristic and parameter processor (643). Subsequent measurements can be made with the remote sensor in analyzing the brightness measurement test pattern, which can automatically be projected at times when feature content is not being shown.

The method and steps of the brightness data capturing and processing used in block (202) and (208) are as follows: assuming a model of the left eye projector brightness in code space is $B_L = a_L \cdot I_L^{2.6} + b$ and right eye projector brightness model in code space is $B_R = a_R \cdot I_R^{2.6} + b$, a test pattern, described above in which a solid black image with N Gaussian bright green dots, can be used. This may be the same test pattern described in PCT Patent Application No. PCT/IB2009/005945, titled "Methods and Systems for Reducing or Eliminating Perceived Ghosting in Displayed Stereoscopic Images," and filed Jun. 15, 2009. In the brightness measurements, any image encoding devices (627 and 629 such as a polarizer) and decoding devices (628) can be removed from being in the image light path. The projected bright dots in the test pattern can be set to two different values in which the remote sensor (i.e. camera) can be used to capture the screen test pattern image and the brightness of the dots. First, the maximum value of Gaussian dots can be set to 1. The camera can be used to capture a gray level snapshot of the screen when the test pattern described above is shown by the right projector and while the left projector is displaying a complete black image. This snapshot image can be identified as Z1. The camera measurement can be repeated when the left projector is projecting the test pattern and the right projector is displaying a black image. This snapshot image captured by the camera can be identified as Z2. Both of the previous measurements can be repeated when the maximum value of the Gaussian dots has been reduced to 0.766. These two subsequent snapshot images can be identified as Z1' and Z2' with respect to the previous snapshot. There are now four measurements which form a set of the following equations:

$$\begin{cases} Z_1 = ka_L + b_L \\ Z'_1 = ka_L \cdot 0.766^{2.6} + b_L = ka_L \cdot 0.5 + b_L \\ Z_2 = ka_R + b_R \\ Z'_2 = ka_R \cdot 0.766^{2.6} + b_R = ka_R \cdot 0.5 + b_R \end{cases} \quad (12)$$

Solving the equations results in:

$$\begin{cases} a_L = \frac{2(Z_1 - Z'_1)}{k} \\ a_R = \frac{2(Z_2 - Z'_2)}{k} \end{cases} \rightarrow \frac{a_L}{a_R} = \frac{Z_1 - Z'_1}{Z_2 - Z'_2} \quad (13)$$

The ratio of projected left and right brightness measurement from the target location can be used to normalize the ghosting coefficient. Subsequent left and right brightness measurements made in the manner described above can then be used to compute the subsequent ghosting coefficient.

To calibrate the system when making reflection brightness ratio measurements a test pattern as shown in FIG. 7 can be projected. The test pattern (700) can include a number of bright spots (702) distributed over the screen on a background (704) in which the brightness of the background is adjustable. Initially the background 704 is set to black. A first sensor reading, from the sensor (623) at the target seat location can be obtained of the center of each of each bright spot in the test pattern when the maximum value of the dots with a Gaussian distribution is set to 1. At the same time, a sensor (630) at the booth location can obtain a first brightness reading for each of the same bright spots. Next, the brightness of the background 704 is set to a white level equal to 1. A second sensor reading from the sensor (623) at the target seat location can be obtained of the center of each of the original bright spot locations in the test pattern. At the same time, a sensor (630) at the booth location can obtain a second brightness reading for each of the original bright spot locations. The brightness data from the booth sensor and target seat location can be transferred to the system characteristic and parameter processor (643). Subsequent measurements can be made with the remote sensor in analyzing the brightness measurement of the test pattern. The calibration can be carried out automatically at times when feature content is not being shown such as between shows or before or after the day's shows.

The method and steps of the reflection brightness ratio calibration for each projector in block (800) can include the following: assuming a model of the resulting overall brightness having a reflection brightness term in code space is $B = (a \cdot I^{2.6} + b) + r \cdot \bar{B}$, where a, b are parameters, r is reflection brightness ratio, $\bar{B}$ is the overall screen brightness and I is the image intensity in code value. Assuming the first sensor readings of the image from the target seating location can be identified as $B1 \approx (a \cdot I^{2.6} + b)$ when $\bar{B} \approx 0$ because background is 0; the first sensor readings of the image from the booth location can be identified as B1'. The second sensor readings of the image captured by the sensor at target seating location can be identified as $B2 = (1+r) \cdot (a \cdot I^{2.6} + b)$ when background brightness is 1; the second sensor readings of the image captured at booth location can be identified as B2'; in all cases, the intensities I of the projected bright spots 702 are kept same. Then the reflection brightness ratio at the target location can be, $$r = \frac{B2}{B1} - 1 \quad (14)$$

And the reflection brightness ratio at the booth location can be:

$$r' = \frac{B2'}{B1'} - 1 \quad (13)$$

The ratio of the brightness measurements from both the target location and booth location can be used to get the initial calibration r and booth reference r' of reflection brightness ratio. The subsequent brightness measurements (808) for each projector can be made at the booth location and used to compute and update the subsequent reflection brightness ratios by, $$r = \frac{(B_2 - B_1)B'_1}{(B'_2 - B'_1)B_1} r' = kr' = k\left(\frac{B''_2}{B''_1} - 1\right) \quad (16)$$

This calibration can be done separately for each projected color, e.g. RGB.

A ghosting transfer function calibration process according to some aspects is described. The left and right eye projectors can have the encoding device (629 and 627 respectively) in their respective image light path. For example, to determine the left eye ghosting coefficient in this approach a test pattern of large white dots spaced out over the screen area can be displayed with a black background between the dots by the left eye image projector (e.g. FIG. 7). The right eye projector can display the negative image (i.e. negative image of FIG. 7) of the left eye image projector test pattern super-positioned on the projected left eye test pattern image. The white areas of the left and right eye image test pattern can have the same input image pixel brightness values. A viewer in the target seat views both test patterns through the left eye decoding device. To the viewer, prior to any adjustment, the brightness of the white dots is greater than that of the area around the white dots. The input image pixel brightness value of each of the white dots of the left eye test pattern can be adjusted so that the viewer can no longer distinguish the brightness of each of the dots with the brightness of the area around each of the dots. The resulting, input image pixel brightness value in code space for each white dot divided by the input image pixel brightness value in code space of the surrounding area can represent the ghosting coefficient at the target seat for the left eye for each dot.

To determine the right eye ghosting coefficient in this approach a test pattern of large white dots spaced out over the screen area can be displayed with a black background between the dots by the right eye image projector (same as FIG. 7). The left eye projector displays the negative image of the same test pattern super positioned on the first test pattern. The right and left eye test pattern image can be encoded for right and left eye viewing respectively. The white areas of the right and left eye image test pattern can have the same input image pixel brightness values. A viewer in the target seat views both test patterns with only the right eye decoding element. To the viewer, prior to any adjustment, the brightness of the white dots is greater than that of the area around the white dots. The input image pixel brightness value of each of the white dots of the right eye test pattern can be adjusted so that the viewer can no longer distinguish the brightness of each of the dots with the brightness of the area around each of the dots. The resulting input image pixel brightness value in code space for each white dot divided by the input image pixel brightness value in code space of the surrounding area can represent the ghosting coefficient at the target seat for the right eye for each dot.

The ghosting coefficients at the target seat can be determined by a relative comparison means in that the viewer looks to null out any perceived difference in brightness between each white dot and the surrounding area. The ratio of the pixel code values when a null condition is satisfied represents the ghosting coefficient at the target seat. To automate the process each white spot is located and its brightness may be determined accurately.

The following algorithms can be used to reliably register the dot position and retrieve the brightness information from the noisy captured image of the camera.

By using the described test pattern, the image registration can be automatic and accurate. After detecting N Gaussian dots and their centres, the brightness information can be estimated at the location where the original ghosting calibration matching is done. The algorithm can be immune to random noise, additive stray light, non-linear distortion and types of affine transformations. To reliably detect the Gaussian dots, the Laplacian of Gaussian operator can be used. A Gaussian kernel of scale s is:

$$g(x, y, s) = \frac{1}{2\pi s} e^{-(x^2+y^2)/(2s)} \quad (17)$$

The filtering applied to original image f(x,y) is expressed as:

$$L(x,y,s) = g(x,y,s) * f(x,y) \quad (18)$$

When the Laplacian operator is applied:

$$\nabla^2 L = L_{xx} + L_{yy} \quad (19)$$

For multi-scale LOG detector, scale-normalized Laplacian can be used:

$$\nabla_{norm}^2 L(x,y,s) = s(L_{xx} + L_{yy}) \quad (20)$$

The detection can find the simultaneously local maxima/minima with respect to both space and scale.

$$(x,y,s) = \arg\max\min \text{local}_{x,y,s}(\nabla_{norm}^2 L(x,y,s)) \quad (21)$$

For some applications, the process can be simplified to a single scale filtering if the test pattern has known structure and dot size. Also the space search can be simplified to a global thresholding. After LoG filtering, calibration dots can result strong positive responses (which may be surrounded by strong negative response) and other places are 0. After the segmentation of LoG response, the actual dot coordinates can be obtained from finding the local response maximum or centroid of local maximums. This can achieve the registration accuracy within one pixel.

After the reliable dot registration, the brightness information can be retrieved at each dot location by finding the weighted average of each segmented dot region in the original images captured by camera. The average weights can be chosen as LoG response values. The brightness for other non dot locations can be smoothly interpolated by a linear filter.

The following description explains how data from remote sensing location can be used to update a parameter or characteristic measured from a target seat according to some aspects.

FIG. 5 shows a one example of a system model that includes a theatre arrangement with a screen (510), a seat position (523) in the slope of rows of racked seats (525), a projector light (501) with an original source brightness represented by E and a sensor (530). G(s,x,y) is the gain function related to sensor location s(530) and screen location (x,y) (512). B(target,x,y) is the brightness at the target seat location and B(s,x,y) is the brightness at the remote sensor location. Provided the brightness reading change of the sensor is linear with the brightness change of the projector and the encoder and decoder elements do not change over time the system can be expressed using the following relationship:

$$B(s,x,y) = a \cdot G(s,x,y) \cdot E + b \quad (22)$$

a, b are parameters modeling a general linear relationship. Parameter b can be caused by many factors, such as the black level brightness produced by DMD, inter-lens reflection, and reflection from the theater walls and seating deck, particularly in large immersive theatre environments such as in IMAX theaters where the seating deck is much closer to the screen. Though the general form (2) can be used in implementation, the factor b May be small and can be ignored in most of descriptions.

During, the calibration of the projection system, a sensor can be positioned at the target seat location to determine the brightness B(target,x,y) for the target location (523) and a sensor can be positioned at the projector booth to determine the brightness B(booth,x,y) at the remote sensor location (530). B(target,x,y)=α·G(target,x, y)·E can be known for the target seat and B(booth,x,y)=α·G(booth,x,y)·E at the booth location is known. The relationship between these two sensor locations can be expressed as:

$$E = \frac{B(\text{booth}, x, y)}{G(\text{booth}, x, y)} = \frac{B(\text{target}, x, y)}{G(\text{target}, x, y)} \quad (23)$$

The further relationship between the different time slots (t and t') can be based on the screen gain functions in any location (s, x, y) being constant over time:

$$\frac{B'(s, x, y)}{E'} = \frac{B(s, x, y)}{E} \quad (24)$$

substituting E in (3) into (4):

$$\frac{B'(s, x, y)G(\text{booth}, x, y)}{B'(\text{booth}, x, y)} = \frac{B(s, x, y)G(\text{booth}, x, y)}{B(\text{booth}, x, y)} \quad (25)$$

Therefore the brightness at later time t' for any in-theater location can be updated by its previous measurement at time t, and booth measurement at time t plus the new booth measurement at time t'. The expression is as follows, where B(booth,x,y) is not zero.

$$B'(\text{target}, x, y) = \frac{B'(\text{booth}, x, y)}{B(\text{booth}, x, y)} B(\text{target}, x, y) \quad (26)$$

An example of two characteristics that are dependent on the brightness parameter is ghosting coefficient and inter-projector brightness. Inter-projector brightness can be expressed as a ratio of left and right eye brightness and if perfectly matched the ratio of left and right eye brightness is 1. Using the above relationship and the method of FIG. 1, it is possible to update a characteristic at a target seat based on a subsequent measurement of brightness from a remote sensor location.

The above generalized normalizations, however can be performed by other methods and the invention should not be limited to one or more of the aspects and examples disclosed herein.

While the present subject matter has been described in detail with respect to specific aspects and examples hereof, those skilled in the art, upon attaining an understanding of the foregoing may readily produce alterations to, variations of, and equivalents to such aspects and examples. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method for modifying input image data, the method comprising:
   receiving an initial system characteristic measured at a target location;
   receiving a system parameter of a system characteristic measured at a remote location other than the target location;
   computing an initial normalized system characteristic by normalizing the system characteristic measured at the target location with respect to the system parameter of the system characteristic measured at the remote location;
   receiving a subsequent system parameter measured from the remote location;
   computing a subsequent system characteristic for the target location using the initial normalized system characteristic and the subsequent system parameter measured from the remote location; and
   modifying the input image data using the subsequent system characteristic to produce normalized input image data for system function processing that outputs enhanced image data for display.

2. The method of claim 1, wherein modifying the input image data using the subsequent system characteristic comprises:
   comparing the subsequent system characteristic to a pre-defined desired profile to produce an optimal normalized subsequent system characteristic map; and
   using the optimal normalized subsequent system characteristic map to modify the input image data to produce the normalized input image data for system function processing that outputs the enhanced image data for display.

3. The method of claim 2, wherein modifying the input image data using the subsequent system characteristic further comprises:
   comparing the subsequent system parameter to the pre-defined desired profile to produce an optimal normalized subsequent system parameter map; and
   using the optimal normalized subsequent system characteristic map and the optimal normalized subsequent system parameter map to produce the normalized input image data for system function processing that outputs the enhanced image data for display.

4. The method of claim 3, wherein comparing the subsequent system parameter to the pre-defined desired profile to produce the optimal normalized subsequent system parameter map comprises:
   producing the optimal normalized subsequent system parameter map based on an intra-projector parameter profile.

5. The method of claim 3, wherein comparing the subsequent system parameter to the pre-defined desired profile to produce the optimal normalized subsequent system parameter map comprises:
   producing the optimal normalized subsequent system parameter map based on an inter-projector parameter profile.

6. The method of claim 3, wherein comparing the subsequent system parameter to the pre-defined desired profile to produce the optimal normalized subsequent system parameter map comprises:
   producing the optimal normalized subsequent system parameter map based on optimizing an intra-projector parameter profile.

7. The method of claim 3, wherein the system parameter is projector brightness.

8. The method of claim 2, wherein comparing the subsequent system characteristic to the pre-defined desired profile to produce the optimal normalized subsequent system characteristic map comprises:
   producing the optimal normalized subsequent system characteristic map based on an intra-projector characteristic profile.

9. The method of claim 2, wherein comparing the subsequent system characteristic to the pre-defined desired profile to produce the optimal normalized subsequent system characteristic map comprises:
   producing the optimal normalized subsequent system characteristic map based on an inter-projector characteristic profile.

10. The method of claim 2, wherein the system characteristic is ghosting coefficients.

11. The method of claim 2, wherein the system characteristic is projector brightness.

12. The method of claim 2, wherein the system characteristic is environment reflection brightness ratio.

13. The method of claim 1, further comprising:
    deriving the initial normalized system characteristic at the target location from a mathematical model of the system characteristic.

14. The method of claim 1, wherein the system function processing comprises deghosting feature processing.

15. The method of claim 1, wherein the system function processing comprises brightness uniform feature processing.

16. The method of claim 1, wherein the system function processing comprises processing for an environment aware reflection compensation feature.

17. The method of claim 1, wherein computing the initial normalized system characteristic comprises determining the initial normalized system characteristic using measured data from the target location and the remote location.

18. The method of claim 1, wherein receiving the initial system characteristic measured at the target location comprises:
displaying a test pattern;
measuring, by a first sensor at the target location, the initial system characteristic using the test pattern; and
measuring, by a second sensor at the remote location, an initial parameter of the initial system characteristic using the test pattern,
wherein computing the initial normalized system characteristic comprises determining the initial normalized system characteristic based on the initial system characteristic measured by the first sensor and based on the initial parameter measured by the second sensor.

19. A projection system comprising:
a system characteristic and parameter processor configured for:
computing an initial normalized system characteristic by normalizing a system characteristic measured at a target location with respect to a system characteristic measured at a remote location that is different than the target location; and
computing a subsequent system characteristic for the target location using the initial normalized system characteristic and the subsequent system parameter measured from the remote location;
an input image normalization module for modifying input image data using the subsequent system characteristic prior to a projection enhancing system function to create a virtual projector system; and
a projector configured for displaying enhanced image data from the input image data modified with the subsequent system characteristic.

20. The projection system of claim 19, wherein the system characteristic and parameter processor is further configured for:
receiving the initial system characteristic measured at a target location;
receiving a system parameter of the system characteristic measured at a remote location;
receiving the subsequent system parameter measured from the remote location.

21. The projection system of claim 20, wherein the system characteristic and parameter processor is configured to modify the subsequent system characteristic by comparing the subsequent system characteristic to a pre-defined desired profile to produce an optimal normalized subsequent system characteristic map,
wherein the input image normalization module is configured for using the optimal normalized subsequent system characteristic map to modify the input image data to produce the normalized input image data for system function processing that outputs the enhanced image data for display.

22. The projection system of claim 21, wherein the system characteristic and parameter processor is configured to modify the subsequent system characteristic by:
comparing the subsequent system parameter to the pre-defined desired profile to produce an optimal normalized subsequent system parameter map; and
using the optimal normalized subsequent system characteristic map and the optimal normalized subsequent system parameter map to produce the normalized input image data for system function processing that outputs the enhanced image data for display.

23. The projection system of claim 19, wherein the projector comprises dual projectors configured to operate simultaneously for a two-dimensional presentation or for a three-dimensional presentation.

24. The projection system of claim 19, wherein the projector is a single projector configured for a two-dimensional presentation or a three-dimensional presentation.

25. The projection system of claim 19, wherein the projection system is the virtual projector system in a first theatre, wherein at least one of:
a measured system characteristic of the projection system is configured to be matched to a desired characteristic profile that is the desired characteristic profile of a second projection system in a second theatre; or
a measured system parameter of the projection system is configured to be matched to a desired system parameter profile that is the desired system parameter profile of the second projection system in the second theatre.

* * * * *